United States Patent
Garcia et al.

(10) Patent No.: US 11,444,679 B2
(45) Date of Patent: Sep. 13, 2022

(54) RECEPTION BEAM SELECTION FOR A RADIO ACCESS NETWORK

(71) Applicant: Telefonaktiebolaget LM Ericsson (publ), Stockholm (SE)

(72) Inventors: Virgile Garcia, Antibes (FR); Niklas Jaldén, Enköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 57 days.

(21) Appl. No.: 16/754,261

(22) PCT Filed: Oct. 30, 2017

(86) PCT No.: PCT/CN2017/108388
§ 371 (c)(1),
(2) Date: Apr. 7, 2020

(87) PCT Pub. No.: WO2019/084723
PCT Pub. Date: May 9, 2019

(65) Prior Publication Data
US 2020/0280362 A1    Sep. 3, 2020

(51) Int. Cl.
H04B 7/08      (2006.01)
H04B 7/06      (2006.01)
H04L 5/00      (2006.01)
H04W 72/04     (2009.01)
H04W 72/12     (2009.01)

(52) U.S. Cl.
CPC .......... *H04B 7/088* (2013.01); *H04B 7/0617* (2013.01); *H04L 5/001* (2013.01); *H04W 72/046* (2013.01); *H04W 72/1226* (2013.01); *H04W 72/1273* (2013.01)

(58) Field of Classification Search
None
See application file for complete search history.

(56) References Cited

U.S. PATENT DOCUMENTS

2012/0264469 A1    10/2012  Dartois et al.
2016/0241322 A1*   8/2016   Son .................... H04B 7/0417
2016/0323756 A1    11/2016  Shen et al.
(Continued)

FOREIGN PATENT DOCUMENTS

CN    101192866 A    6/2008
CN    104184561 A    12/2014
(Continued)

OTHER PUBLICATIONS

EPO Communication with Supplementary European Search Report dated May 18, 2021 for Patent Application No. 17930468.8, consisting of 8-pages.
(Continued)

*Primary Examiner* — Phirin Sam
(74) *Attorney, Agent, or Firm* — Christopher & Weisberg, P.A.

(57) ABSTRACT

There is disclosed a method of operating a receiving radio node in a radio access network. The method includes selecting, from a set of defined reception beams formed by reception beamforming, one or more beams for processing, wherein selecting is based on a beam quality representation determined for one or more beams of the set for one or more transmitters.

13 Claims, 5 Drawing Sheets

(56) References Cited

U.S. PATENT DOCUMENTS

| | | | |
|---|---|---|---|
| 2017/0104517 A1 | 4/2017 | Kakishima et al. | |
| 2017/0134964 A1 | 5/2017 | Yu et al. | |
| 2018/0041936 A1* | 2/2018 | Kim | H04W 72/085 |
| 2018/0241458 A1* | 8/2018 | Jung | H04L 5/0023 |
| 2019/0053072 A1* | 2/2019 | Kundargi | H04L 43/16 |
| 2019/0053271 A1* | 2/2019 | Islam | H04W 74/0866 |
| 2019/0116605 A1* | 4/2019 | Luo | H04B 7/024 |
| 2019/0123798 A1* | 4/2019 | Lou | H04B 7/061 |
| 2020/0022040 A1* | 1/2020 | Chen | H04W 36/0085 |

FOREIGN PATENT DOCUMENTS

| | | |
|---|---|---|
| WO | 2017105299 A1 | 6/2017 |
| WO | 2018068208 A1 | 4/2018 |

OTHER PUBLICATIONS

Li You et al.; BDMA for Millimeter-Wave/Terahertz Massive MIMO Transmission with Per-Beam Synchronization; IEEE Journal on Selected Areas in Communications; vol. 35, No. 7, Jul. 2017, consisting of 14-pages.

3GPP TSG-RAN WG2 #99bis R2-1711058; Title: Cell selection/reselection basics for NR IDLE—cell quality derivation; Agenda Item: 10.4.4.3; Source: Nokia, Alcatel-Lucent Shanghai Bell; WID/SID: NR_newRAT-Core—Release 15; Document for: Discussion and Decision; Date and Location: Oct. 9-13, 2017, Prague, Czech Republic, consisting of 5-pages.

International Search Report and Written Opinion dated May 29, 2018 for International Application No. PCT/CN2017/108388 filed on Oct. 30, 2017, consisting of 7-pages.

* cited by examiner

RECEPTION BEAM SELECTION FOR A RADIO ACCESS NETWORK

CROSS-REFERENCE TO RELATED APPLICATIONS

This application is a Submission Under 35 U.S.C. § 371 for U.S. National Stage Patent Application of International Application Number: PCT/CN2017/108388, filed Oct. 30, 2017 entitled "RECEPTION BEAM SELECTION FOR A RADIO ACCESS NETWORK," the entirety of which is incorporated herein by reference.

TECHNICAL FIELD

This disclosure pertains to radio access technology/networks (RAT/RAN), in particular in the context of reception beamforming.

BACKGROUND

In modern wireless communication systems, technology utilising multiple antennas or antenna arrays are becoming more widely spread, allowing use of beamforming for transmission (transmission beamforming), but also for reception (reception beamforming). However, handling large sets of beams may become computationally expensive, and may cost valuable time.

Thus, improved ways of handling beams, in particular reception beams, are needed.

SUMMARY

It is an object of this disclosure to provide approaches allowing improved handling of sets of reception beams, in particular facilitating computational efficient selection of beams. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR (New Radio), for example release 15 or later, or LTE Evolution. The approaches may in particular be implemented for VL-MIMO (also referred to as Massive MIMO), in particular MIMO reception.

Accordingly, there is disclosed a method of operating a receiving radio node in a radio access network. The method comprises selecting, from a set of defined reception beams formed by reception beamforming, one or more beams for processing. Selecting is based on a beam quality representation determined for one or more beams of the set for one or more transmitters.

Moreover, there is described a receiving radio node for a radio access network. The receiving radio node is adapted for selecting, from a set of defined reception beams formed by reception beamforming, one or more beams for processing. Selecting is based on a beam quality representation determined for one or more beams of the set for one or more transmitters.

The receiving radio node may be any radio node receiving signaling utilising a set of beams for the receiving, in particular a network node. However, in some cases, the receiving radio node may be implemented as a terminal or user equipment. The receiving radio node may comprise processing circuitry and/or radio circuitry, in particular one or more receivers, and/or may be connected or connectable to, and/or comprise, antenna circuitry and/or an antenna arrangement, for receiving and/or defining and/or selecting the one or more beams. Alternatively, or additionally, the receiving radio node may comprise a corresponding selecting module and/or defining module and/or receiving module. A transmitter may be any radio node transmitting signaling, e.g. intended for the receiving radio node, in particular a user equipment or another radio node, e.g. on a backhaul link.

Selecting one or more beams may include performing processing of the beam/s. Processing may comprise demodulating and/or decoding signaling received with beams, and/or associating it with specific types of signaling, e.g. as scheduled, and/or to specific channel/s. Alternatively or additionally, processing may comprise scheduling transmitters and/or transmissions (e.g., associated to a channel and/or transmitter and/or bearer and/or layer and/or data stream), e.g. based on the selection of beams, and/or based on the beam quality representation. Such processing may be performed independent, and/or in addition, of selecting beams, and may pertain to transmission to the transmitter/s, and/or to transmission from the transmitter/s.

With these approaches, an efficient beam selection may be performed, in particular considering that it may not be necessary to account for all beams from a set to provide good enough reception to perform desired processing.

Different beams may differ in topology and/or shape and/or angular and/or spatial extension and/or direction and/or size and/or regarding to resources, in particular time and/or frequency resources. Different beams in some cases may overlap, e.g. in angular/spatial extension, and/or time/frequency, or be completely distinct. It may generally be considered that beams of the set are time-shifted, e.g. within the same transmission timing structure, like a transmission time interval or and/or slot or subframe. It should be noted that due to multi-path propagation, signaling from a transmitter may be received in different beams, even if they do not overlap.

The set of beams may comprise a plurality of beams, in particular 2 or more, 4 or more, 8 or more, 10 or more, 12 or more, 16 or more, or 20 or more, or 50 or more beams. The set may pertain to a specific time interval, and/or comprise beams used in and/or defined and/or configured for that interval. A beam, or the set of beams, may change over time, e.g. in the time interval, e.g. due to beam switching and/or beam sweeping. The time interval may, for example, be a transmission timing structure. The set of beams may comprise reception beams defined or formed by (reception) beamforming. The set of reception beams may be defined, e.g. based on location of the receiving radio node, and/or may be configured or configurable, e.g. during operation. During operation, it may not be necessary or efficient to use all beams for further processing, such that a selection out of the set may be useful.

Selecting one or more beams may comprise selecting a subset of beams, the subset being smaller than the set, and/or containing and/or consisting of not all beams of the set. The subset thus may be considered a true or limited subset of the set.

Beamforming may generally comprise utilising independently controllable antenna elements and/or arrays (or sub-arrays/panels), which may be associated to an antenna arrangement, to produce a directed beam of radiation (for transmission), or to provide a (directional and/or angular, in particular regarding spatial angle) cut-out of an incoming radiation field according to a reception beam, e.g. based on timing and/or phase. A beam may have complicated shape, e.g. it may be multi-lobed, and/or irregular, depending on the number of antenna elements/arrays used for defining it. Reception beamforming may be performed by beamforming circuitry, which may be adapted therefor, and/or may be performed on based on a total receives signal or received radiation field. Depending on implementation, beamforming circuitry may be processing circuitry, and/or antenna circuitry and/or radio circuitry, or implemented separately. An antenna arrangement may comprise a plurality of different antenna elements and/or arrays (or subarrays, e.g. panel/s), which may be independently controllable. Being independently controllable for reception beamforming may be considered to comprise and/or represent that signals representing a received radiation field (e.g., output by an ADC and/or amplifier of associated to the antenna element or array) may be handled (evaluated) independent from signals from other such devices, which may be associated to different array/s and/or antenna element/s. Reception beamforming may comprise a beam space transformation, in which signals from an antenna arrangement, in particular from different independently controllable antenna elements or subarrays or arrays, are mapped to define a set of beams in a beam space representation. An antenna arrangement may comprise at least 10, at least 20, at least 50 or at least 70 independently controllable antenna elements or arrays or subarrays, e.g. panels. In some variants, antenna elements may be configurably associated to (different) subarrays.

Selecting may in general be based on a beam quality representation determined for one or more beams and/or for one or more of multiple layers of transmission from the one or more transmitters. A beam quality representation may represent a beam quality measure or metric for the beam, and may pertain to a specific transmitter or a group of transmitters, e.g. based on location. It may be considered that the beam quality representation generally represents and/or pertains to one or more beam quality metrics. Selecting may be performed in regular or irregular time intervals, e.g. based on operation conditions, e.g. number of transmitters from which transmission is to be expected and/or served by the receiving radio node. In particular, selecting (e.g., of different beams or subsets) may be performed for each transmission time interval or slot or subframe, or slot aggregation, or for a specific time interval like 1 ms or 2 ms, or a frame (a frame may comprise a predefined number of slots or subframes, or be fixed to e.g. 10 ms). A layer of transmission may correspond to a transmitted signaling using a specific transmitting antenna configuration (e.g., element or subarray or array). Different layers may correspond to different signaling/data streams, which may be transmitted by different antenna elements or arrays or subarrays (the antenna elements being associated to the transmitter; transmitters may have different antenna arrangements from the receiving radio node).

Generally, the beam quality representation may be determined based on the beam quality measure or metric, which may be determined, e.g. measured and/or estimated and/or calculated and/or evaluated and/or received from another node, for example as part of selecting the one or more beams. Such determining may be performed for each beam, optionally for each transmitter. It may be considered in this context that the transmitters to which this disclosure pertains are known or are making themselves known to the receiving radio node, e.g. due to being registered with, and or identified to, the network, and/or due to identifying themselves to the receiving radio node, and/or due to performing or having performed a random access procedure or other procedure identifying them. Other source of radiation may be considered interference sources.

It may be considered that the beam quality representation represents and/or pertains to one or more beam quality metrics. The one or more beam quality metrics may pertain to received signal strength, and/or received signal quality, and/or covariance of received signaling, and/or direction of received signaling. Receiver strength may be represented by a suitable parameter, e.g. by received power and/or energy and/or amplitude, and/or a distribution thereof. Signal quality may be represented by a suitable parameter like SNR, SINR, SIR, etc. Covariance may be represented by a covariance parameter. The beam quality representation, metric or measure may be determined based on received signaling, in particular reference signaling, which may be measured to determine the representation, metric or measure. The reference signaling may be associated to and/or transmitted by a transmitter and/or user.

A beam quality representation may in general be associated to a user and/or transmitter (a user may represent a transmitter). One or more beams may be associated to a transmitter or user, e.g. due to multi-path effects. For different users and/or transmitters, different beam quality representations may be determined, in particular for different and/or each beam. It may be considered that for each user/transmitter, and/or for each beam, a beam quality representation is determined, e.g. as part of selecting the one or more beams. A beam quality representation may comprise and/or pertain to one or more measures, metrics or parameters, and may be considered a parametrisation or a set of one or more parameters. Alternatively, or additionally, a beam quality representation may pertain to a plurality of transmitters, e.g. transmitters in the beam represented. In this case, the beam quality representation may represent one or more beam quality metrics pertaining to a combination of signalings received from the transmitters, e.g. a received signal representing the sum and/or combination and/or aggregation of signalings received from the transmitters.

In particular, a beam quality representation may be associated to a transmitter and/or user, and may represent a combination of a plurality of beam quality metrics for one or more beams.

It may be considered that selecting is performed based on a combination of beam quality representations of beams for more than one transmitter and/or user. In particular, a combined beam quality representation for a subset may be determined for one or more subsets of beams, and/or the complete set. A combined beam quality representation may be considered to comprise and/or represent beam quality representations for a plurality of, in particular for each, transmitter.

It may be considered that selecting is performed based on one or more, e.g. a set of, scheduling characteristics.

In some variants, selecting may be performed based on a combination of beam quality representations of beams for more than one transmitter, wherein selecting further is performed based on one or more, e.g. a set of, scheduling characteristics.

A scheduling characteristic may be a representation of a condition pertaining to scheduled transmission/s, which may be associated to one or more of the transmitter/s, and/or be received utilising one or more reception beams. It should be noted that the receiving radio node may be considered to be aware of such scheduled transmission, e.g. because it scheduled it itself, e.g. if implemented as a network node, or because if was configured with such information, e.g. by another radio node, in particular a network node. Selecting may be based on one or more such characteristics for each transmitter or beam. A scheduling characteristics may generally pertain to a higher level (or non-physical layer) characteristic of transmission expected from a transmitter, e.g. due to scheduling or configuration. The scheduling characteristic may in particular pertain to a channel and/or bearer and/or the data to be transported thereon. A scheduling characteristic may in particular pertain to signaling to be processed based on the beam selection. It should be noted that the beam quality representation may be determined based on different types of signaling/transmission than the scheduling characteristics pertains to. For example, the beam quality representation may be performed based on reference signaling, wherein the scheduling characteristic may pertain to data transmission, e.g. on a shared channel like a PUSCH, which may be transmitted in the same time interval, e.g. transmission timing structure or transmission time interval, as the reference signaling, wherein both signalings may be considered stemming from the same transmitter. A scheduling characteristic may pertain for example to priority, transmission timing and/or resources, quality of service requirements/request, and/or latency requirements, bit rate and/or MCS used (the MCS may be indicative of the bit rate; in some variants, the MCS may be considered to represent a beam quality metric), acknowledgment information related to, and/or carried by the signaling and/or retransmission status, error rate target (e.g., Block Error Rate), etc.

Selecting may generally comprise comparing a beam quality representation with a threshold and/or requirement/s, e.g. regarding signal quality and/or strength or data/bit rate. Selecting may be performed such that the smallest subset of beams fulfilling the requirement/s is selected, or is considered for selection, e.g. by combining it with subsets determined for different transmitters/layers.

There is also considered a program product comprising instructions causing processing circuitry to control and/or perform any one of the methods described herein.

Moreover, a carrier medium arrangement is described, the carrier medium arrangement carrying and/or storing a program product as described herein.

BRIEF DESCRIPTION OF THE DRAWINGS

The drawings are provided to illustrate concepts and approaches described herein, and are not intended to limit their scope. The drawings comprise.

DETAILED DESCRIPTION

Multi-antenna systems allow transmitting signals focused towards certain spatial regions. This creates beams ("beam forming") whose coverage, in terms of range and/or energy or power density, can go beyond transmissions using non-beamformed signals, but at the cost of narrower angular coverage. This is a classic trade-off between distance/range and angular coverage.

In 5G/NR, radio devices are expected to operate with large number of antennas ("Massive MIMO"), offering flexibility and potentially very narrow beams (very large focusing gain). Massive MIMO makes a clean break with current practice through the use of a very large number of service antennas (antenna elements, a number larger than 20 may be considered large) that may be operated fully coherently and adaptively (independently controllable). However, approaches in which antenna elements are grouped into independently controllable arrays or panels are considered as well.

Massive MIMO uncovers entirely new problems that need attention, especially related to practical considerations. In particular, processing multiple parallel data streams from all the antennas requires significant processing capability (hardware and software). Considering massive MIMO with dozens or hundreds of signals, the real time processing is a major challenge. Channel estimation and combining are particularly affected by the scaling of the numbers.

Figure 1:
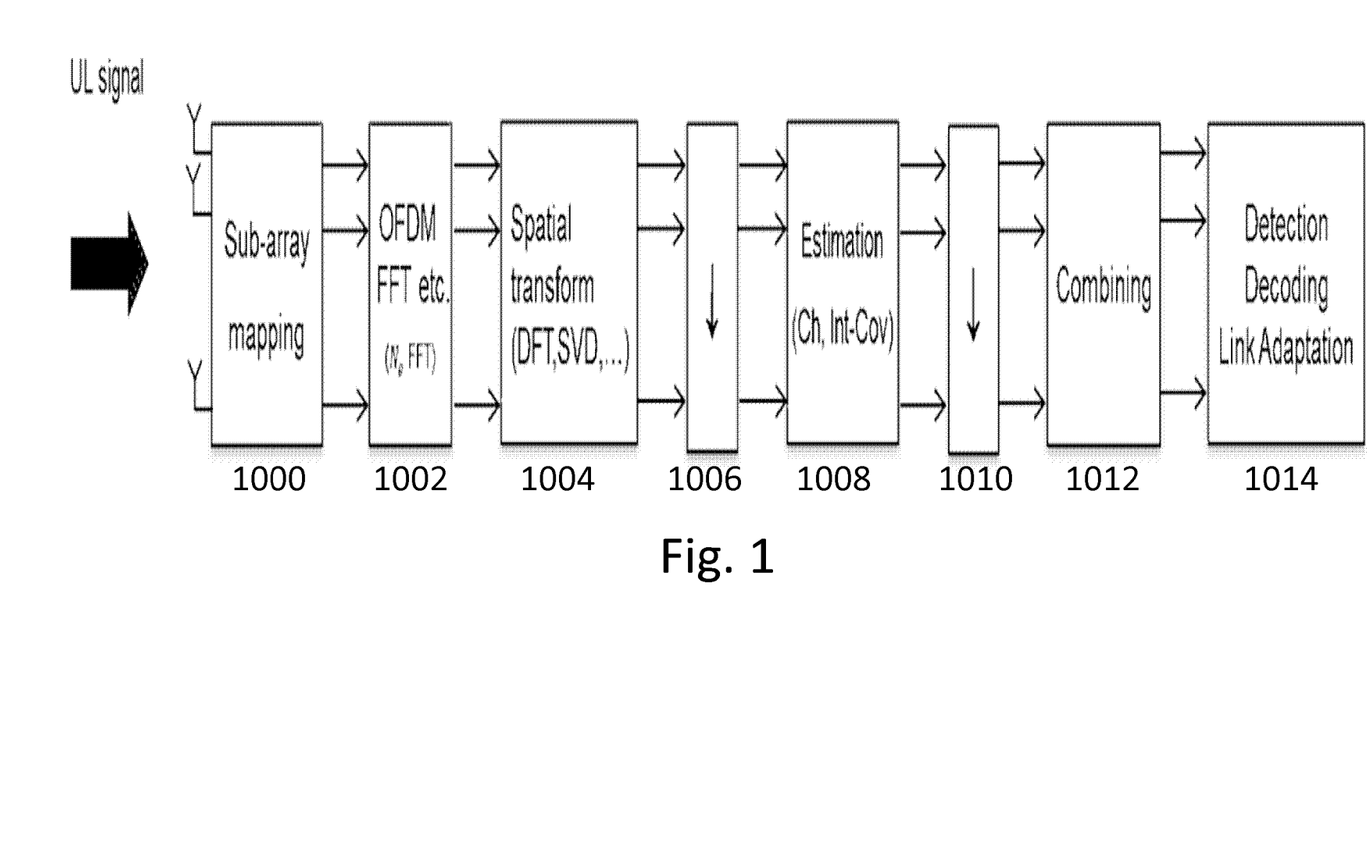
FIG. 1, showing an exemplary receiving radio node.

FIG. 1 shows an exemplary receiving radio node. It should be noted that the components described may be distributed over different devices, which may in combination may be considered to represent the node. An antenna arrangement 100 may receive signaling, which in this form may represent an UL signal, and which may be associated/mapped to one or more subarrays. The signal may undergo signal processing, e.g. Fast-Fourier Transformation or similar, in a signaling processor 1002. Reception beams may be formed/defined in a beamforming unit or corresponding circuitry 1004, which may be considered in some variants to provide dispreading and/or a spatial transform, e.g. by providing a transformation into beam space. Additional processing may be performed in one or more additional units 1006. BQMs may be determined, e.g. based on estimations of channels (for example, channel estimation/signal strength) or related to covariance, e.g. in an estimation or metric unit 1008. Additional processing may be performed in unit 1010. A combining unit 1012 may provide one or more CBQM representations based on the beams and/or the output of the metric unit 1008. The combining unit may evaluate the CBQM representations, and/or select a subset of beams for processing. Processing may be performed in a processing unit or arrangement 1014, which may detect and/or decode signaling in the beams selected, and/or may perform scheduling or link adaption (selecting MCS for further transmission) based on the selection. It should be noted that this is an example only, and functionality may be omitted, or combined, or provided by separate units and/or devices.

Beam space transformation and compression are discussed in the following. Utilizing multiple antennas at the receiver (receiving node) allows for sampling of signaling over a larger antenna aperture, which increases the overall received power. Further, it allows for coherent combination of multiple copies of the received signal, and hence provides an additional receive beamforming gain in the direction of interest (by forming corresponding beams or directional/angular cut outs). Since the transmitters/users, and signals are in general not distributed evenly in space, this may provide a possibility of only processing the signals (beams) which contain valuable information. Hence, the beam space processing, performing a beam space transformation to define/determine a set of beams, with beam selection (after beam space processing/transformation) may provide a complexity reduction for reception beams.

Beam selection (i.e. the process of choosing which beams to process and which beams to discard) aims to reduce the complexity of processing, by selecting only the beams that are considered useful.

A received signal (total signal, or received radiation field) is a superposition of all user signals (signaling from all transmitters, plus noise/interfering sources). It is important to select beams formed from such a received signal that will ensure a good signal quality for all scheduled users/transmitters.

The proposed approaches allow selecting beams according their usefulness to each user and/or layer individually. The beam selection is may be done based on a single, or multiple sets of metrics. Evaluation criteria for beams and prioritization methods to perform the beam selection for multiple users/transmitters are suggested.

Approaches described herein facilitate balancing of the number of beams for each user/layer, and allow fairness among user and focus on preferred users (e.g. depending on each layer's requirement). Prioritisation of certain users/transmitters and/or services (e.g. depending on each layer's requirement) is also facilitated. Moreover, the approaches described herein may provide valuable information for subsequent scheduling decisions, e.g. regarding which users and/or layers are best to co-schedule.

Figure 2:
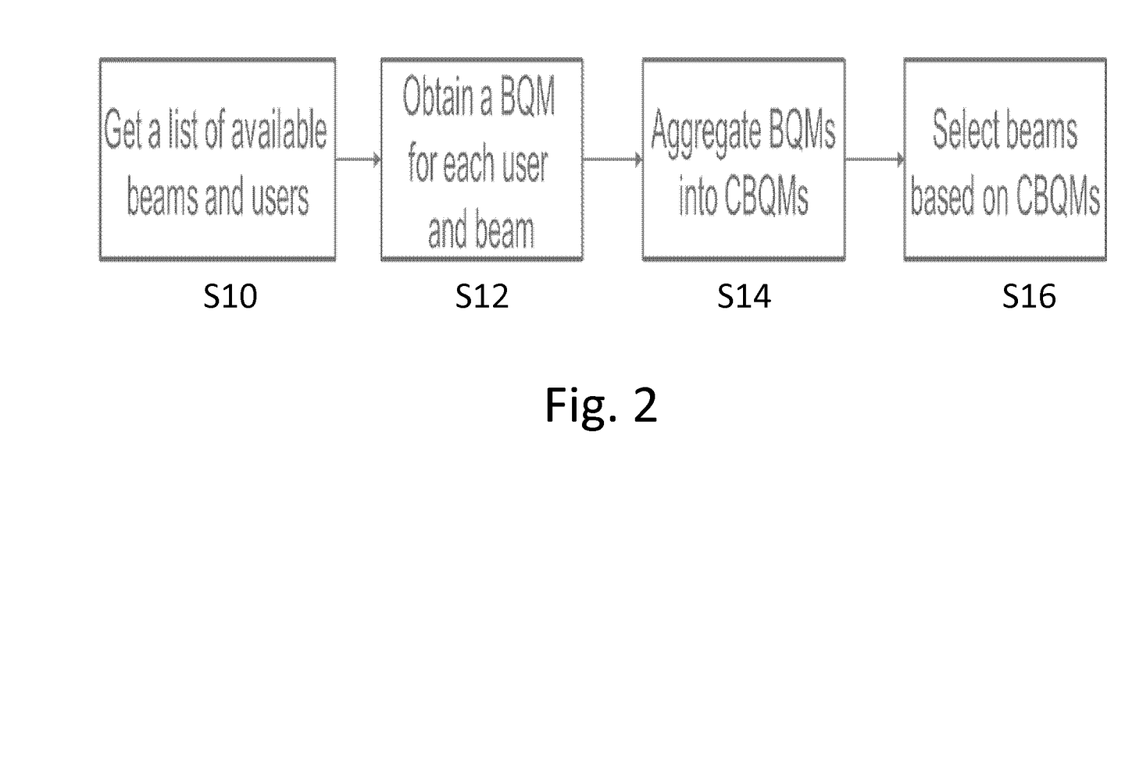
FIG. 2, showing an exemplary flow diagram for selecting beams.

Generally, as indicated exemplarily in FIG. 2 as action S10, selecting and/or beamforming may be based on information representing the possible set of active users (or transmitters) and/or layers, which may be obtained e.g. based on historical information and/or prior scheduling decisions/configurations, in particular the configuration for the transmission timing structure the set pertains to.

For each user or transmitter or layer for which the performance or relevance should be performed (e.g., based on a configuration, or priority set or service level), one, or a plurality or set of, beam quality metric/s (BQM) per beam may be determined, e.g. measured and/or estimated and/or calculated, as indicated as S12 in FIG. 2. The number of BQMs and the criterion used for deriving the BQM/s may depend on the problem that needs to be solved, e.g. the operation conditions, number of transmitters, etc. Examples of metrics may pertain and/or represent: Energy/Power level (or signal strength), Signal over noise ratio, Correlation factor/s (e.g. autocorrelation of multi-path signaling, or correlations between signaling), channel estimation (e.g., based on reference signaling), covariance estimations, direction, such as Angle of Arrival (AoA), etc.

A BQM may be determined or obtained for example based on estimations, and/or direct measurements on the current received signals, and/or feedback (e.g., feedback signaling or acknowledgment signaling), and/or estimations of second order effects, or any combination thereof. By using feedback, or estimation of past data (historical information), added delay may be taken into account, and may affect the performance differently depending on the scenario, deployment, type of service, etc. The BQM definition (respectively, which metric/s are used) can also change depending on the scenario or applications or operation conditions. Some BQM can introduce some computation complexity to give more accurate or valuable information details. Such complexity may be considered useful as a tradeoff between BQM value and processing delays.

The available beams (of the set of beams) may vary in properties (e.g. beam direction, gain etc.) in time and/or frequency. The set of available beams for selection is not necessarily the entire set of existing beams, as some may be inactive or reserved for other purposes. Thus, it is important to know what beam the system should evaluate the BQM on and perform the selection. Thus, the set of beams to select from may be considered to be defined before and/or for selection.

The per user and/or per layer BQM's (e.g., in a Multi-user/Multi-Layer setup), may be aggregated to a combined BQM representation (CBQM representation), which may be parametrized by a corresponding CBQM value (see S14). Selection of beams may be performed based on the CBQM (see S16). A CBQM representation may represent and/or be based on different metrics for one beam and/or transmitter (e.g., representing a beam quality representation for one transmitter/user), such that for example CBQMs for different transmitters may be considered, or for one transmitter and a plurality of beams, e.g. representing a subset of beams pertaining to one transmitter. For example, for each such subset, it may be determined whether the CBQM representation satisfies or fulfils a metric requirement (metric requirements), and a selection may be based on the subset with the minimum number of beams fulfilling the requirement/s, or be based on the subset with expect lowest processing efforts, or similar. The subsets for different transmitters may be combined to provide the subset of beams selected for processing. Other ways of selecting/combining subsets may be considered. In some variants, when a final CBQM is obtained, the beams for processing may be chosen/selected based on their given CBQM value. For example, the N beams to process may be the beams with the N highest CBQM values.

In some variants, a CBQM representation may represent a full candidate subset for selection, e.g. including a set of beams for a plurality of transmitters (wherein for each transmitter, there may be one or more beams in the subset). The selection may be performed such that different CBQM representations are compared, and the one most suitable (e.g., minimum number of beams and/or expected processing effort) is selected, e.g. considering the fulfillment of requirements. The method for combining the BQM's may depend on the specific problem to solve. The beam combination can use user-specific scheduling or traffic requirement information, as examples of scheduling characteristics. Exemplary metrics (or scheduling characteristics) based on which combining may be performed may be based on priority, e.g. a priority list between the data streams and/or transmitters and/or channels and/or bearers, to be processed, allocated resources (e.g., according to size and/or channel), MCS selection for each user, QoS requirements (e.g. traffic type, BLER target, latency), HARQ info (e.g. how many times the data has been or will be repeated), etc.

A beam combination can follow a customable fairness rule among these priorities. The prioritization can be decided either by the scheduler directly and transmitted or provided for beam selection, or be decided by circuitry performing beam selection (e.g., a corresponding unit), e.g. based on scheduling-related information.

Some examples for user (transmitter) specific beam selection are presented in the following. In one example, the beam quality metric (BQM) is determined based on energy level, signal over noise ratio, or correlation factors between beams, or a combination thereof. Since these values are non-user-specific, this will render the CBQM step trivial.

In a second example, user specific BQMs are used, such as channel estimates, channel estimation quality, and information regarding direction of arrival information (AoA), e.g. to assess the relevance of all available beams. This requires some further processing, in terms of channel estimation etc., of the received beams as compared to the case above.

In an alternative or additional variant, the BQM may be are stored, e.g. for transmitters like active users, and/or for beams. The stored, historical values, may be used in subsequent selecting processes, and/or transmissions and/or BQM calculations. This provides detailed BQM information at a decreased processing effort. Such historical information may be used in dynamic or learning algorithms to predict the quality of beams for each user/stream. Historical information may be stored in, and/or accessed at, a separate storage node, e.g. a node of a higher network layer, or a storage node used by a plurality of nodes for storing such information.

User (transmitter) and/or stream prioritization may be considered. Some examples for beam selection to achieve different objectives are highlighted. In one example, in a multi-user scenario, the CBQM may be determined utilising a "round-robin" approach, wherein the beam with the highest BQM for the first user is given the highest CBQM metric. Then, the strongest beam for the second user is given the second highest CBQM metric. This may be repeated successively until all the beams in the system have obtained been provided a CBQM metric, or the maximum total number of streams is reached.

In another variant, other selection and/or prioritisation methods may be utilised. For instance, to maximize the system throughput, the CBQM aggregation may sort streams according to the payload they carry (e.g. using MCS and/or resource allocated, e.g. measured in PRBs or resource elements), and may focus the beam prioritization on the streams with the highest payloads first. Accordingly, CBQM determination and/or selection of beams may be determined based on payload type or size, and/or resources. Payload type may be considered to be represented e.g. by a QoS parameter and/or channel type.

Generally, the traffic (e.g., data or payload) type and/or QoS requirements may be used as inputs to the CBQM aggregation. For example, streams with the shortest delay requirements (latency) or that convey critical information may be given the highest priority and/or be assigned a corresponding CBQM metric value.

Figure 3:
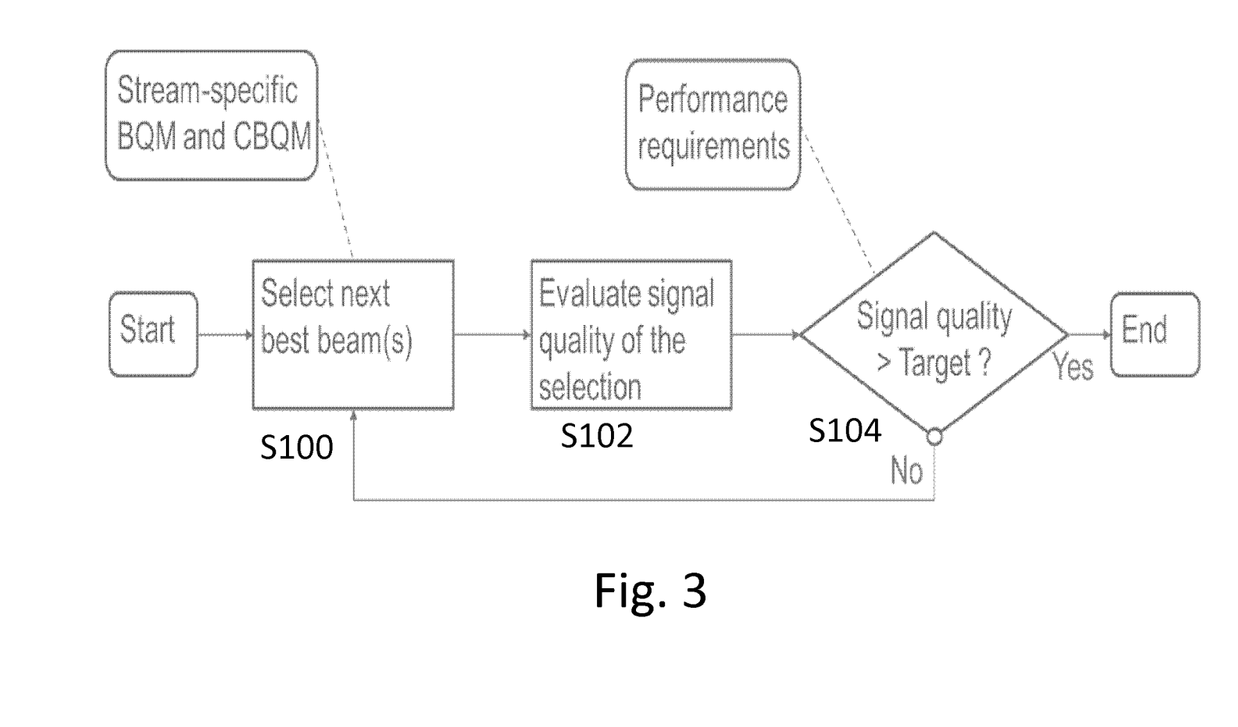
FIG. 3, showing an exemplary flow diagram for stream-specific beam selection.

FIG. 3 shows a flow chart of an exemplary stream-specific selection algorithm. Data stream-specific BQM and/or CBQM representation/values are determined, and one or more beams with the best (e.g., highest value, or lowest value, depending on metric used) may be determined/selected, as shown in action S100. This selection may represent a candidate subset of beams. In S102, the signal quality, as an example of a parameter subject to requirements, may be determined (evaluated), e.g. for each stream and/or transmitter associated to a stream, for the selected beams. If, as indicated in S104, the requirement, in this case represented by a signal quality target, is fulfilled, the subset of beams is selected for further processing. Otherwise, it is returned to S100, with a different selection of beams (e.g., with one or more beams from the defined set being added). The signal quality may for example be represented by SIR, SNR, SINR, signal strength, etc.

In some variants, the CBQM representations/values may be determined based on additional information, e.g. on the number of beams needed, or sufficient SINR required, for proper decoding of data. In such a combination process, successively more beams may be added to a CBQM representation until a given stream quality is satisfied. Once a stream is satisfied, it may be taken out of the selection loop, that can focus on other streams. A stream may be estimated to be satisfied based on a combination of the BQM of the selected beams and the information related to the streams (e.g. scheduling requirements), e.g. depending on the processing system available (e.g. combining performance).

Combining may in general be based on the MCS selected (e.g., scheduled or configured, or used for transmitting) and/or the targeted BLER, e.g. for evaluating the signal quality target in the combining. The BLER target is typically defined by the scheduling or traffic type. The mapping between signal quality, MCS and BLER is traditionally done through a unique lookup table.

There are generally described approaches and a framework for performing a user-specific beam selection for a receiving radio node comprising a receiver antenna. The selection may be made using user-specific information, users' channel quality for each beam and users' scheduling information. Such information may be shared across different parts of the system (e.g., components of the receiving radio node). The user-specific selection may be particularly important in the context of multi-user reception, where a priority between users is made and will drives the beam selection.

Figure 4:
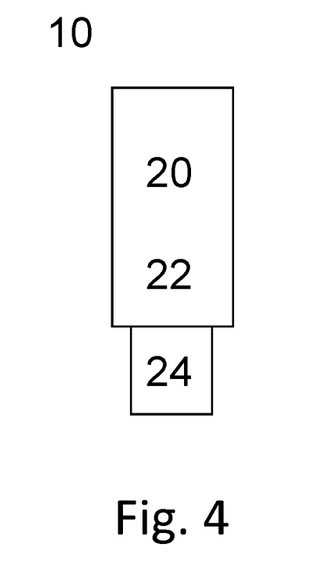
FIG. 4, showing an exemplary receiving radio node implemented as user equipment.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
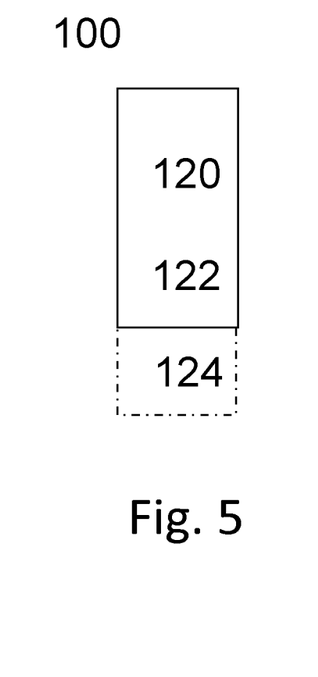
FIG. 5, showing an exemplary receiving radio node implemented as network node.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangements associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink (and/or downlink, for the other direction) communication or similar thereto.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource generally may represent a time-frequency and/or code resource, on which signaling, e.g. according to a specific format, may be communicated, for example transmitted and/or received, and/or be intended for transmission and/or reception.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers.

Alternatively, or additionally, a cell may comprise at least one carrier for UL communication/transmission and DL communication/transmission, e.g., in TDD-based approaches.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or power-related (e.g., SRS or pilot signaling) and/or phase-related, etc.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgement information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects Some useful abbreviations comprise

| Abbreviation | Explanation |
| --- | --- |
| BQM | Beam quality metric |
| BLER | Block Error Rate |
| CBQM | Combined beam quality metric |
| MU | Multiple user |
| ARQ | Automatic Repeat reQuest |
| CBG | Code Block Group |
| CDM | Code Division Multiplex |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DMRS | Demodulation reference signal |
| FDM | Frequency Division Multiplex |
| HARQ | Hybrid Automatic Repeat Request |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |

Abbreviations may be considered to follow 3GPP usage if applicable.

The invention claimed is:

1. A method of operating a receiving radio node in a radio access network, the method comprising:
   selecting, from a set of defined reception beams formed by reception beamforming, at least one beam for processing, the selecting being based on:
   a beam quality measurement, BQM, representation determined for at least one beam of the set of defined reception beams for at least one transmitter of the receiving radio node; and
   a combined beam quality measurement, CBQM, representation determined for at least a subset of the set of defined reception beams, the subset being associated with at least one transmission stream, the CBQM being determined based on a quality of service parameter associated with the at least one transmission stream.

2. The method according to claim 1, wherein the BQM is further determined for at least one of multiple layers of transmission from the at least one-transmitter.

3. The method according to claim 1, wherein the BQM pertains to at least one of:
   received signal strength;
   received signal quality;
   covariance of received signaling; and
   direction of received signaling.

4. The method according to claim 1, wherein the BQM is associated to a transmitter.

5. The method according to claim 1, wherein the BQM is associated to a transmitter, and represents a combination of a plurality of beam quality metrics for at least one beam.

6. The method according to claim 1, wherein the selecting is further performed based on at least one scheduling characteristic.

7. A receiving radio node for a radio access network, the receiving radio node being configured to:
   select, from a set of defined reception beams formed by reception beamforming, at least one beam for processing, the selecting being based on:
   a beam quality measurement, BQM, representation determined for at least one beam of the set of defined reception beams for at least one transmitter of the receiving radio node; and
   a combined beam quality measurement, CBQM, representation determined for at least a subset of the set of defined reception beams, the subset being associated with at least one transmission stream, the CBQM being determined based on a quality of service parameter associated with the at least one transmission stream.

8. The receiving radio node according to claim 7, wherein the BQM is further determined for
   at least one of multiple layers of transmission from the at least one transmitter.

9. The receiving radio node according to claim 7, wherein the BQM pertains to at least one of:
   received signal strength;
   received signal quality;
   covariance of received signaling; and
   direction of received signaling.

10. The receiving radio node according to claim 7, wherein the BQM is associated to a transmitter.

11. The receiving radio node according to claim 7, wherein the BQM is associated to a transmitter, and represents a combination of a plurality of beam quality metrics for at least one beam.

12. The receiving radio node according to claim 7, wherein the selecting is further performed based on at least one scheduling characteristic.

13. A computer storage medium storing an executable computer program having instructions that, when executed, cause processing circuitry to at least of control and perform a method of operating a receiving radio node in a radio access network, the method comprising:
   selecting, from a set of defined reception beams formed by reception beamforming, at least one beam for processing, the selecting being based on:
   a beam quality measurement, BQM, representation determined for at least one beam of the set of defined reception beams for at least one transmitter of the receiving radio node; and
   a combined beam quality measurement, CBQM, representation determined for at least a subset of the set of defined reception beams, the subset being associated with at least one transmission stream, the CBQM being determined based on a quality of service parameter associated with the at least one transmission stream.

* * * * *